United States Patent [19]

McElwaine

[11] 4,090,784

[45] May 23, 1978

[54] APPARATUS FOR FACILITATING READY INSERTION AND REMOVAL OF CASSETTES FROM WELLS

[75] Inventor: David C. McElwaine, Newtonville, Mass.

[73] Assignee: Polaroid Corporation, Cambridge, Mass.

[21] Appl. No.: 756,432

[22] Filed: Jan. 3, 1977

[51] Int. Cl.² .............................................. G03B 23/02
[52] U.S. Cl. ...................................... 352/74; 242/200;
360/134; 242/199; 360/132; 352/72
[58] Field of Search ................ 360/132, 134; 242/199,
242/200; 352/72, 74, 130

[56] References Cited

U.S. PATENT DOCUMENTS 3,809,464  5/1974  Bennett ................................... 352/74

Primary Examiner—Monroe H. Hayes
Attorney, Agent, or Firm—Edward S. Roman

[57] ABSTRACT

Improved apparatus is provided in a viewer of the type having a film cassette receiving well defined in part by an opening in the viewer and an interior sidewall extending perpendicularly inward of the opening and from which extend outwardly a pair of drive heads. The improved apparatus is provided to guide the edge of the leading end wall of a cassette, as it enters the receiving well, past the pair of drive heads and ultimately into nesting relation adjacent the sidewall with the drive heads engaged to complementary recessed drive couplings in the side of the cassette upon complete insertion of the cassette into the well. The improved apparatus not only accommodates the ready insertion of the cassette within the receiving well, but also accommodates the ready removal of the cassette from the well by resiliently urging the bottom of the cassette to move in a direction outward of the cassette receiving well.

7 Claims, 15 Drawing Figures

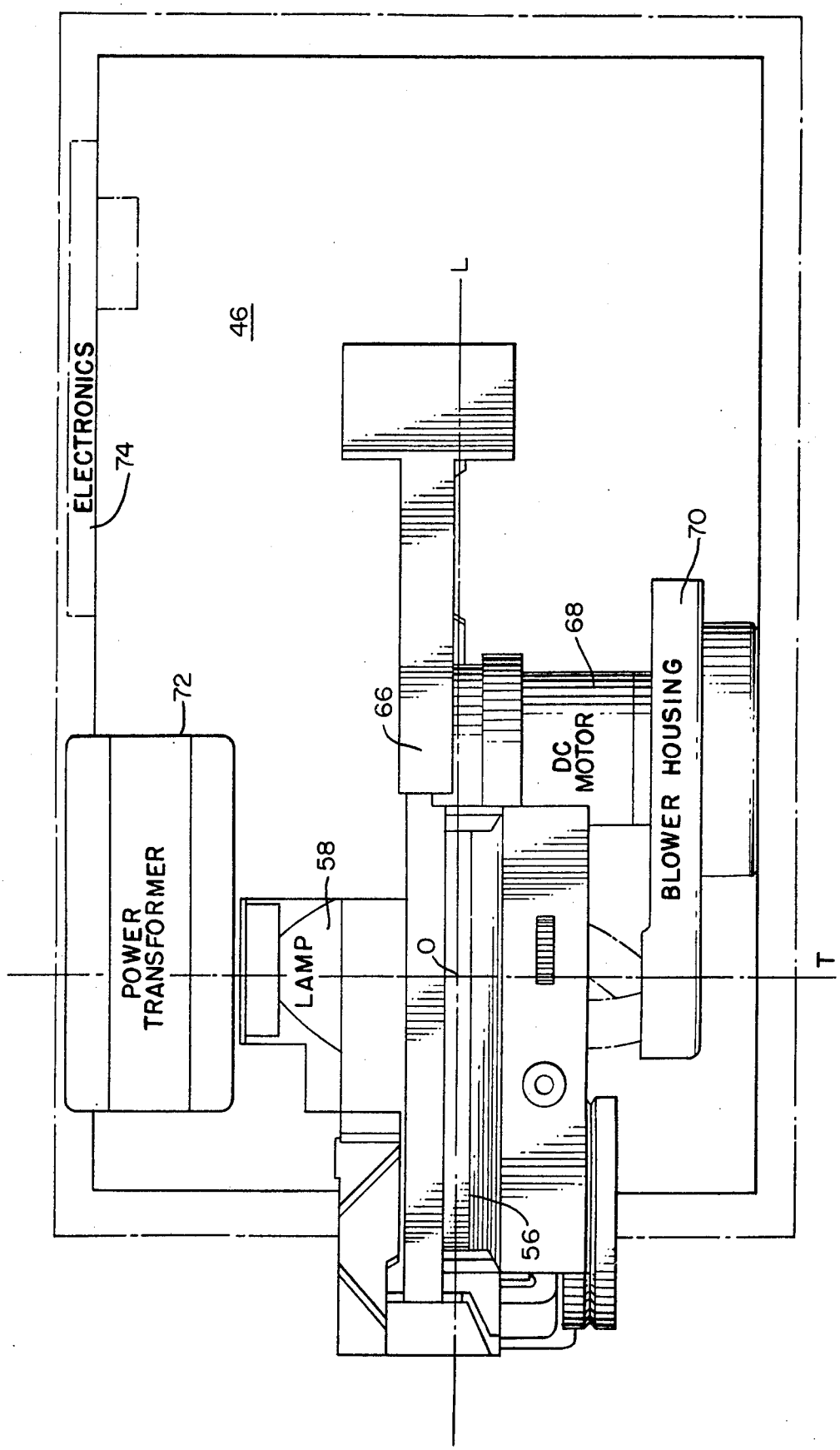

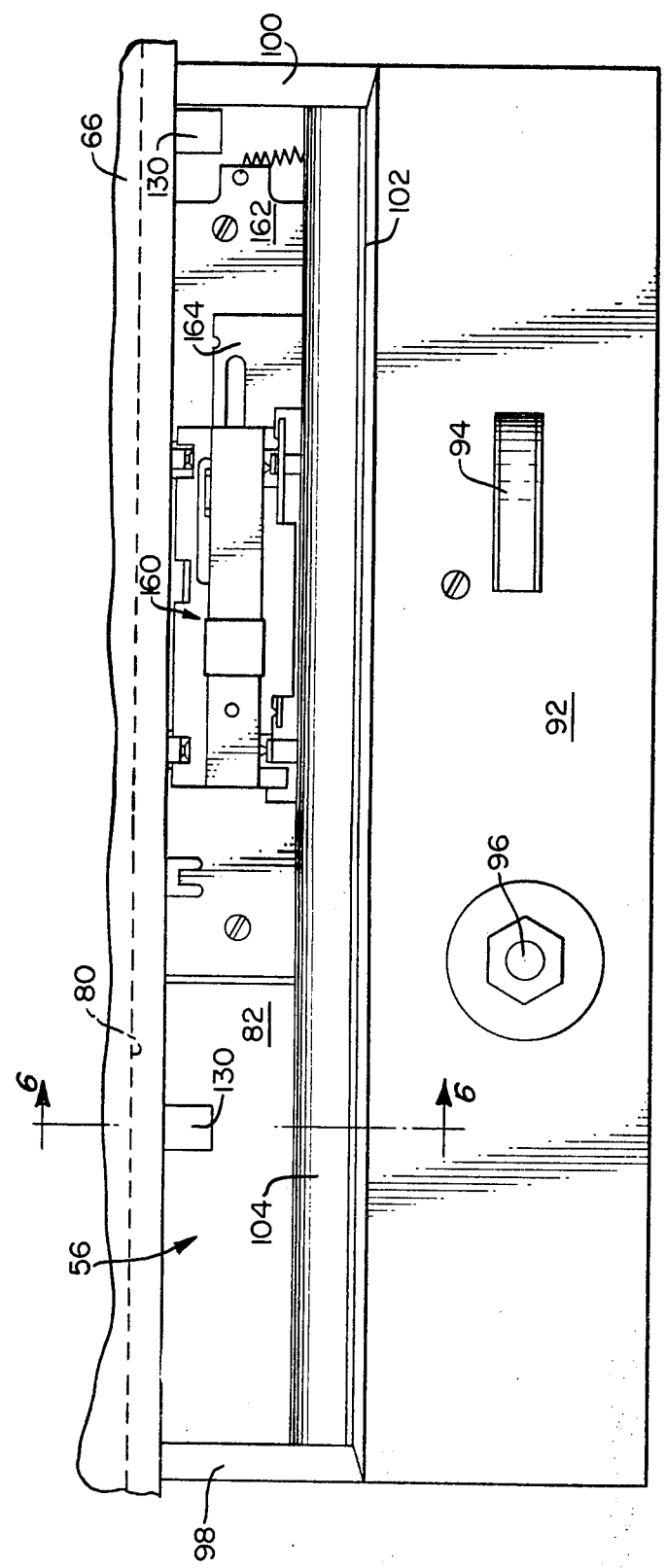

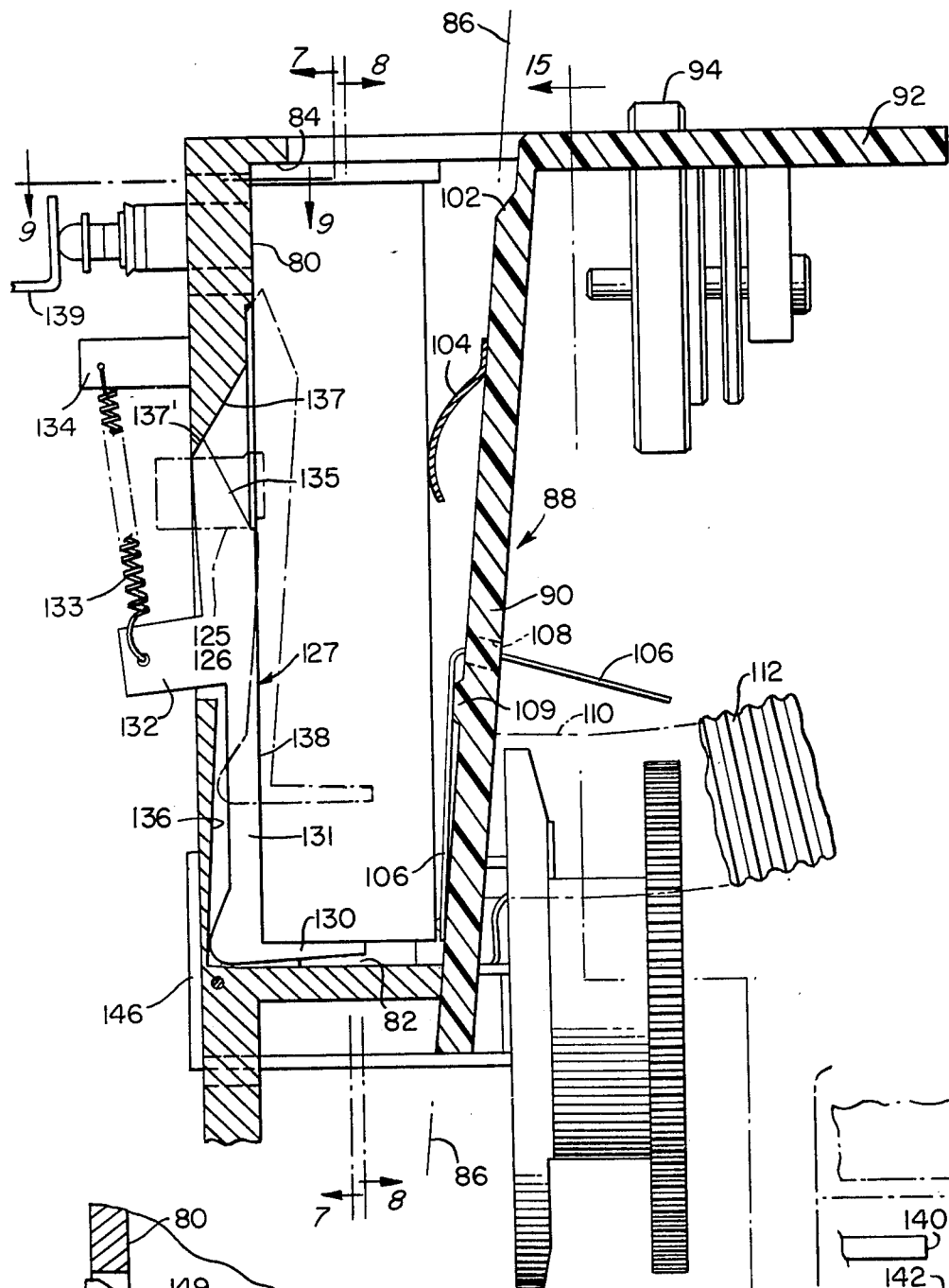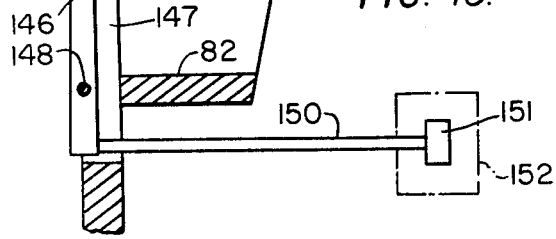

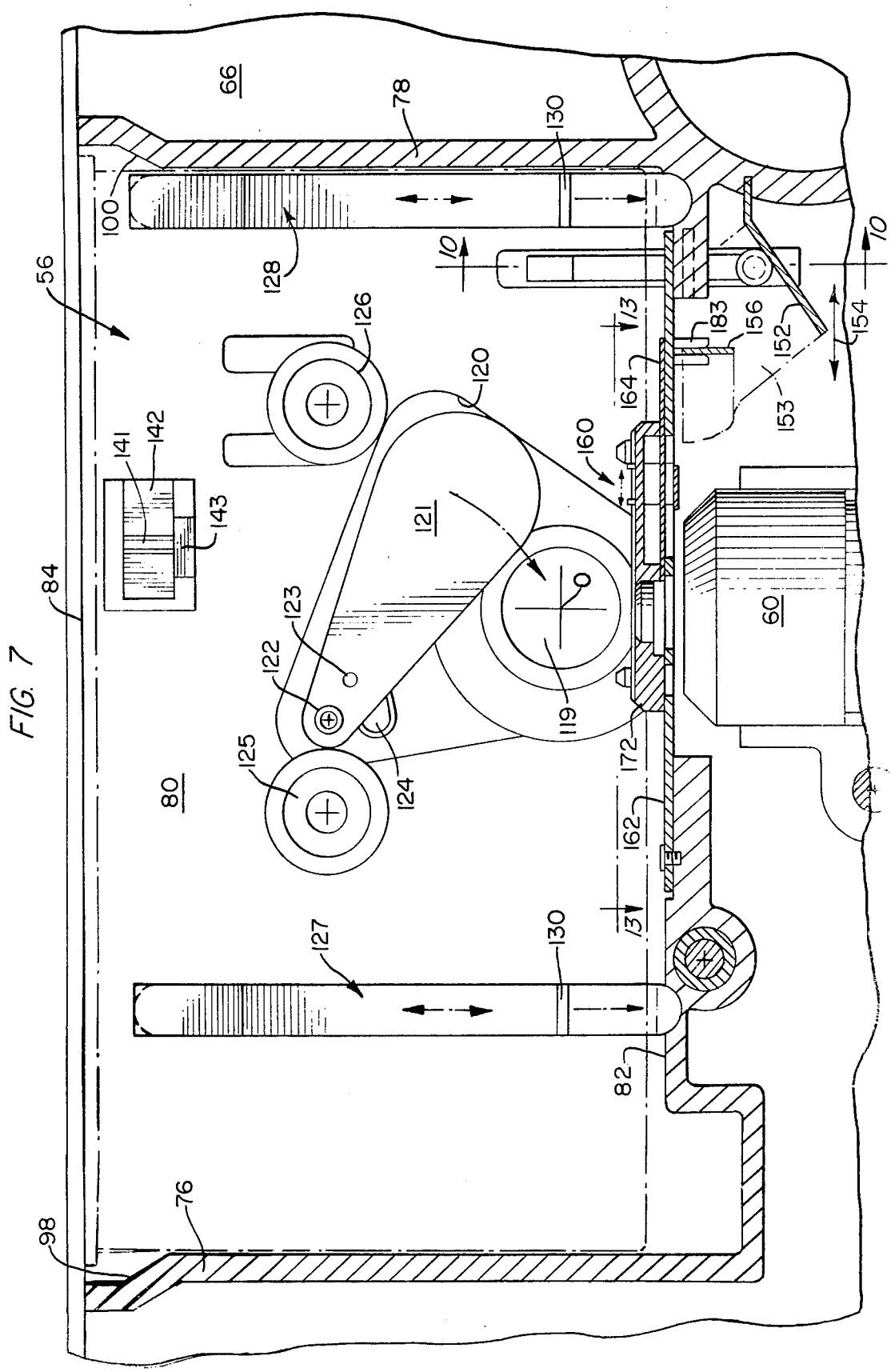

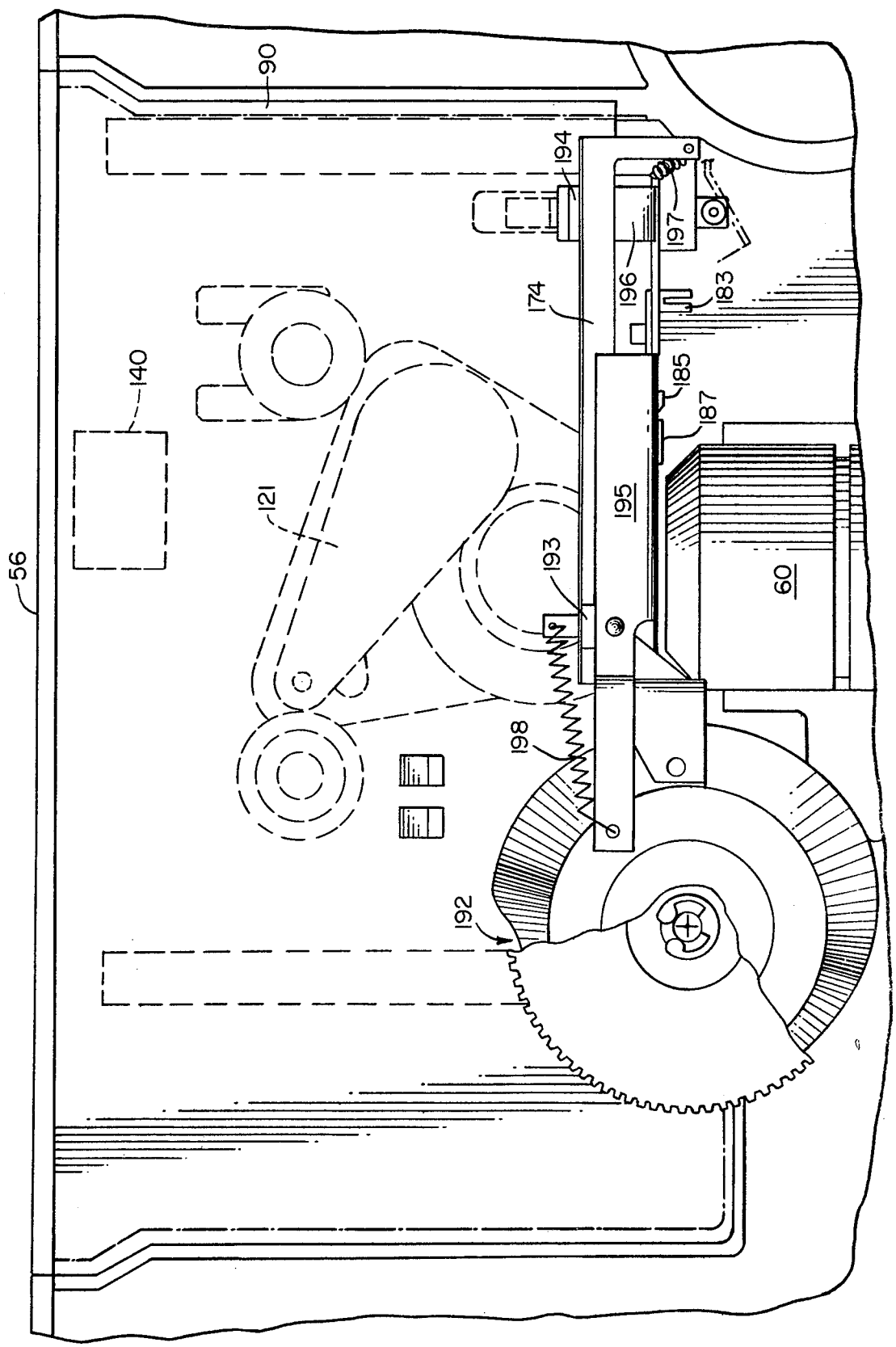

APPARATUS FOR FACILITATING READY INSERTION AND REMOVAL OF CASSETTES FROM WELLS

BACKGROUND OF THE INVENTION

1. Field of the Invention

The present invention relates to a viewer for film cassettes wherein the viewer has improved apparatus for facilitating the ready insertion and removal of the film cassettes from a complementary cassette receiving well in the viewer and more particularly to a viewer for a film cassette wherein a cassette receiving well in the viewer includes improved apparatus for guiding the edge of the leading end wall of the cassette as it enters the well past a pair of drive heads extending outward from a side wall of the well such that complete insertion of the cassette brings the drive heads into driving engagement with complementary recessed drive couplings in the side of the cassette.

2. Description of the Prior Art

In the recently developed motion picture art, the term "multi-purpose film cassette" has been used to denote a generally parallelepiped housing in which a strip of light sensitive film is initially packaged along with a pod or reservoir of processing fluid such that the film strip may be exposed, processed and viewed by inserting the cassette containing the film strip in an appropriate motion picture camera, and subsequently inserting the exposed film cassette into a viewing apparatus operative to coat the exposed film strip with processing fluid to develop the conventional series of image frames for viewing by projection in a very short period of time. The film strip is connected respectively at opposite ends to a cassette contained supply spool and a cassette contained take-up spool. The film strip is wound on the latter spool both during exposure in the camera and during projection in the viewing apparatus by driving the take-up spool after which the film is returned to the supply spool on rewinding as well as for processing. Such cassettes are also provided with a light reflecting prism by which projection light may be directed from the reflecting surface outwardly of the cassette through the opening provided therein for exposure and projection. Disclosures of viewing apparatus for handling such cassettes may be found in U.S. Pat. Nos. 3,830,564 issued Aug. 10, 1974 to John F. Batter, Jr.; 3,909,120 issued Sept. 30, 1975 to Joseph A. Stella; and 3,941,465 issued Mar. 2, 1976 to Irwin E. Figge, et al.

While the cassette receiving well of such viewing apparatus represents only a part of the viewer contained equipment needed to process and project the cassette contained film strip, the nature of the general system imposes several requirements on the viewer structure defining the well. The cassette receiving well includes a planar side wall against which the cassette nests when it is fully inserted within the well. The cassette receiving well includes a pair of spaced apart drive heads which extend laterally outward therefrom for complementary engagement with a pair of recessed cassette drive couplings which respectively connect to the supply and take-up spools within the cassette. Thus when fully inserted, the cassette nests against the planar side wall of the well with the drive heads engaged to respective couplings. Since the cassette ultimately nests upon complete insertion against the planar side wall of the cassette receiving well difficulty arises as a result of the leading edge of the cassette hitting the drive heads in a manner which inhibits complete insertion of the cassette into its receiving well. In addition, the cassette must be readily removable from the cassette receiving well. Toward this end, resilient means may be provided at the bottom of the cassette receiving well to yieldably urge a completely inserted cassette outwardly therefrom.

Thus, it is a primary object of this invention to provide a cassette receiving well with improved apparatus for facilitating ready insertion and removal of the cassette from the receiving well.

It is another object of this invention to provide the cassette receiving well of a viewer with improved apparatus for facilitating the ready insertion of the cassette within the receiving well by guiding the leading edge of the cassette entering the well past a pair of drive heads extending laterally outward from a side wall of the well.

It is still another object of this invention to provide the cassette receiving well of a film viewer with an improved apparatus that not only accommodates the ready insertion of the cassette within the well but also accommodates the ready removal of the cassette from the well by resiliently urging the bottom of the cassette to move in a direction outward of the cassette receiving well.

Other objects of the invention will in part be obvious and will in part appear hereinafter. The invention accordingly comprises the mechanism and system possessing the construction, the combination of elements and the arrangement of parts which are exemplified in the following detailed disclosure.

SUMMARY OF THE INVENTION

The invention relates generally to an improvement in an apparatus for viewing by projection a photographic film strip contained within a substantially thin film cassette which has a pair of opposed major wall surfaces connected and spaced apart by a peripheral wall substantially defining the thickness of the cassette. The cassette additionally has an opening therein for projection of transparent image forms contained on the film strip together with drive coupling means recessed in one major wall surface thereof. The viewing apparatus is typically of the type having means for receiving the cassette and operatively positioning the cassette therewithin including an elongated opening slightly wider than the thickness of the cassette through which the cassette can be slidably inserted into the apparatus. A wall surface extends inwardly from the well opening in a plane substantially perpendicular to the plane of the well opening. At least one spool drive head is journaled for rotation with respect to the wall surface and extends outward therefrom for complementary engagement with the cassette drive coupling means upon complete insertion of the cassette within the apparatus receiving means. Means are also provided for engaging the other major surface of the cassette opposite from the drive coupling means as the cassette enters the apparatus for resiliently urging the cassette toward the wall surface so that the major surface associated with the drive coupling means will ultimately nest against the wall surface with the spool drive head drivably engaging the cassette drive coupling means. Means are further provided for restraining withdrawal of the cassette from the apparatus without first forceably displacing the cassette laterally away from its nesting position adjacent the wall surface.

The improvement of this invention comprises at least one guide member having a first defined edge portion spaced apart from a second defined edge portion together with means associated with the wall surface and complementary to the guide member for connecting the guide member for movement relative to the wall surface between a first position and a second position. When the guide member is in its first position, the first edge portion extends laterally outward from the wall surface beyond the profile of the drive head to engage an edge of the leading peripheral wall of the cassette as it enters the apparatus and the second edge portion is spaced inward of the first edge portion with respect to the opening and also extends laterally outward of the wall surface. When the guide member is in its second position, the first edge portion of the guide member no longer extends laterally outward of the wall surface while the second edge portion of the guide member still extends laterally outward of the wall surface so as to engage the leading peripheral wall of the cassette upon complete insertion of the cassette within the apparatus receiving means. The first edge portion when in its first position operates to engage the edge of the leading peripheral wall of the cassette as it enters the apparatus in a manner such that continued insertion of the cassette into the apparatus operates to move the guide member from its first position toward its second position during which movement the first edge portion operates to guide the edge of the leading peripheral wall of the cassette past the drive head such that upon complete insertion of the cassette into the apparatus, the first edge portion is disengaged from the edge of the leading peripheral wall of the cassette which is thereafter engaged by the second edge portion of the guide member. Resilient means are also provided for yieldably urging the guide member to move from its second position towards its first position thereby resiliently urging the cassette when engaged by the second edge portion to move in a direction outwardly of the apparatus.

BRIEF DESCRIPTION OF THE DRAWINGS

FIG. 4 is a plan view of internal viewer structure;

FIG. 5 is an enlarged fragmentary plan view illustrating the general organization of the cassette well of the invention;

FIG. 6 is an enlarged cross-section on line 6—6 of FIG. 5;

FIG. 7 is a fragmentary cross-section on line 7—7 of FIG. 6;

FIG. 9 is an enlarged fragmentary cross-section taken on line 9—9 of FIG. 6;

FIG. 10 is an enlarged fragmentary cross-section taken on line 10—10 of FIG. 7;

FIG. 15 is an enlarged fragmentary side evaluation of the cassette well of the invention as seen on line 15—15 of FIG. 6.

DETAILED DESCRIPTION OF THE PREFERRED EMBODIMENT

Figure 1:
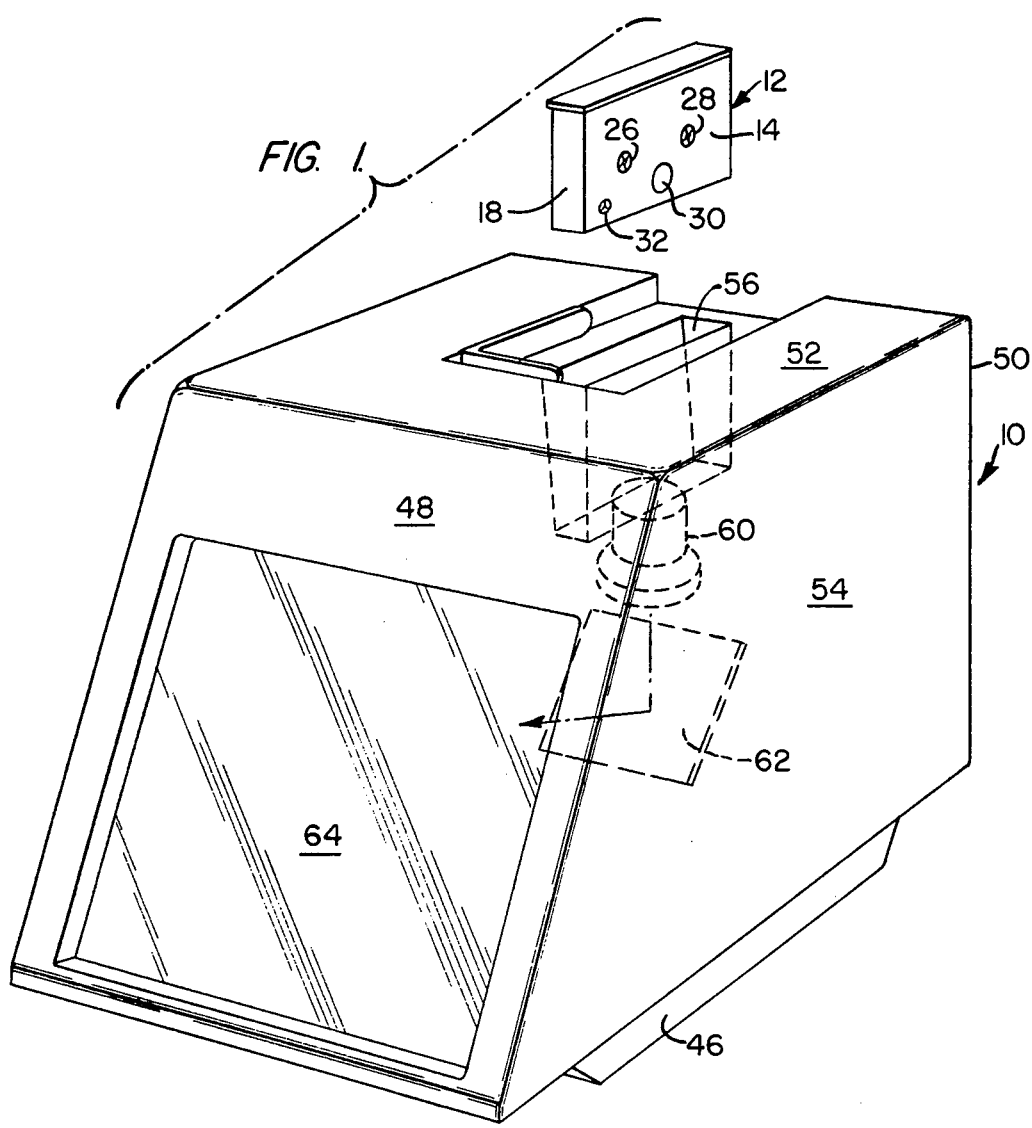
FIG. 1 is an exploded perspective view illustrating a multi-purpose photographic film strip cassette and viewer adapted to process and project images developed on the cassette-contained film strip.

For a general description of the viewing apparatus and film cassette with which the cassette well structure of the present invention is primarily intended for use, reference is made to FIG. 1-4 of the drawings in which the viewer and cassette are respectively designated generally by the reference numerals 10 and 12.

Figure 2:
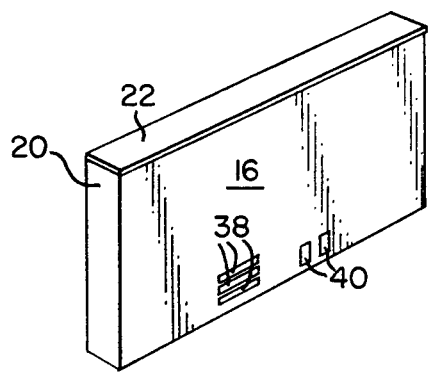
FIG. 2 is a perspective view illustrating the reverse side of the cassette exterior.
Figure 3:
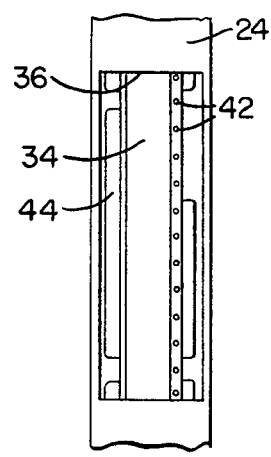
FIG. 3 is a fragmentary perspective view illustrating a segment of film strip contained in the cassette.

Although the cassette 12, in itself, is not novel with the present invention, a brief description of components accessible from the exterior thereof will facilitate a clearer understanding of the operating components of the viewer 10 and the cassette well components to be described in detail below. As shown in FIGS. 1-3 of the drawings, the cassette includes an exterior casing of generally parallelepiped configuration established by opaque planar side walls 14 and 16, end walls 18 and 20 and elongated top and bottom edge walls 22 and 24, respectively. The housing thus constituted contains a pair of film spools which, though not shown as such in the drawings, are in practice each provided with a drive coupling hub or sprocket 26 and 28 recessed in the wall 14 for engagement by viewer carried drive heads to be described below. In addition, and as shown in FIG. 1, the wall 14 of the cassette is apertured to expose a reflecting prism 30 as well as a slotted snubbing roller hub 32. The reflecting prism 30 functions to allow light for projection to be directed through the side wall 14 then reflected downwardly through a film strip 34 as it passes an opening 36 in the bottom wall 24 of the cassette as shown in FIG. 3. The slotted hub 32 is integrally formed with a cassette contained snubbing roller which is adapted for either free rotation or to be fixed as a film snubber when engaged by a viewer mounted component to be described below.

On the opposite side wall 16 shown most clearly in FIG. 2 of the drawings, the cassette is provided with air vent openings 38 positioned immediately behind the prism 30 and with a pair of electrical contacts 40. The contacts 40 are arranged with cassette contained components such that when the film strip 34 has been processed, the contacts will be disconnected electrically from each other whereas in an unprocessed cassette, the contacts 40 will be in circuit continuity with each other. The contacts 40 thus provide an electrical signal for the viewer 10 by which the processed or unprocessed condition of the cassette may be electrically detected.

As shown in FIG. 3, the film strip 34 is provided with feed apertures 42 spaced evenly along one marginal edge thereof and is passed under a pressure plate 44 contained in the cassette 12. The pressure plate is spring biased against the film strip and functions to assure retention of the film strip in planar orientation during projection. It is depressible inwardly of the cassette to free the film strip of drag as during rewinding and processing modes of viewer operation. The cassette 12 and the components presented on the exterior thereof are fully disclosed in the above-identified U.S. patents among others so that further description thereof is believed unnecessary to a full understanding of the present invention. As aforementioned, the cassette 12 is loaded with the film strip 34 together with a processor (not shown) by which the cassette may be placed in an appropriate camera for exposure of the film through the opening 36, removed from the camera and placed in the viewer 10 for processing and projection in accordance with automated programming means operated essentially under control provided essentially by the presence of the cassette and the conductive or non-conductive state of the contacts 40.

The general structural organization of the viewer 10 is shown in FIGS. 1 and 4 of the drawings to include a chassis having a base 46 and supporting an enclosure defined by front and rear walls 48 and 50, a top wall 52 and side walls 54. Presented in the top wall 52 is a cassette receiving well 56 to which the present invention is principally directed. Reception of the cassette 12 in the well 56 enables projection of light eminating in a projection lamp 58 through the prism 30, downwardly through a lens 60 and forwardly from a reflecting mirror 62 to a rear projection translucent screen 64 presented on the front exterior wall 48 of the viewer 10.

The chassis including the base 46 is further constituted by a vertically oriented central support casting 66 shown in FIG. 4. Other components supported either on the base 46 or from the casting 66 on the viewer interior include a drive motor 68, a blower housing 70, a power transformer 72 and an electronics module 74.

While the structure of the well 56 and related components will be described in detail below, it will be noted with reference to FIG. 4 that an optical center O of the viewer is established by the intersection of a longitudinal center plane L and a transverse vertical plane T together with a horizontal reference plane, which though not designated in FIG. 4, is mutually perpendicular to the planes L and T and includes the axis of the projection lamp 58. Orientation of the optical axis O with other structure of the viewer well 56 will be apparent from the description to follow.

An understanding of the structure establishing the cassette well 56 as well as the general organization of components positioned within the well may be gained by reference to FIGS. 5-8 of the drawings. It will be noted particularly with reference to FIGS. 6 and 7 that the casting 66 is provided with projecting flange-like formations 76 and 78 to define the rear, bottom and forward peripheral wall portions of the cassette well 56. A machined, generally planar wall 80 lies within these peripheral wall portions to establish an interior vertical surface along the one side of the well 56 parallel to the vertical longitudinal plane L described above. The interior surface of the wall 80 extends from a cassette floor 82 defined in part by the flange portions 76 and 78, upwardly to a top edge delineated by the underside of a transverse lip 84 extending the length of the well 56. Also as seen in FIG. 6, the distal edges of the flange formations 76 and 78 lie in an inclined plane 86 and provide a bearing surface for a cassette well cover plate 88. The plate 88 is more specifically characterized as being formed of plastic material so as to electrically non-conductive. Also the plate 88 is of inverted L-shaped configuration in transverse section to establish an upright wall portion 90, secured in abutting engagement with the flange formations 76 and 78, and joining at its upper edge in an integral horizontal flange portion 92. The flange 92 supports a focusing knob 94 so that it is presented at the top of the viewer 10 as well as a push button replay switch 96.

It will be observed by reference to FIGS. 5-8 that the mouth of the well 56, as defined by the flange formations 76 and 78 at the ends and by the flanged cover plate 88 on the inclined side of the well, is provided with outwardly flared or chamfered internal surfaces 98, 100 and 102 to facilitate initial inserting movement of the cassette 12 into the well 56. Also as seen in these figures, the interior of the inclined wall 90 of the flanged cover plate 88 supports an outwardly and downwardly extending cassette loading spring and binder 104 which extends longitudinally for a portion of the length of the well 56. In addition, a pair of conductive terminal strips 106 extend downwardly from the apertures 108 over bumps 109, to which they are secured, in a position to be engaged and flexed against the cassette contacts 40 described above with reference to FIG. 2. The terminal strips extend outwardly through the apertures 108 as shown in FIG. 6 to facilitate their connection electrically to the electronics module 74.

Figure 8:
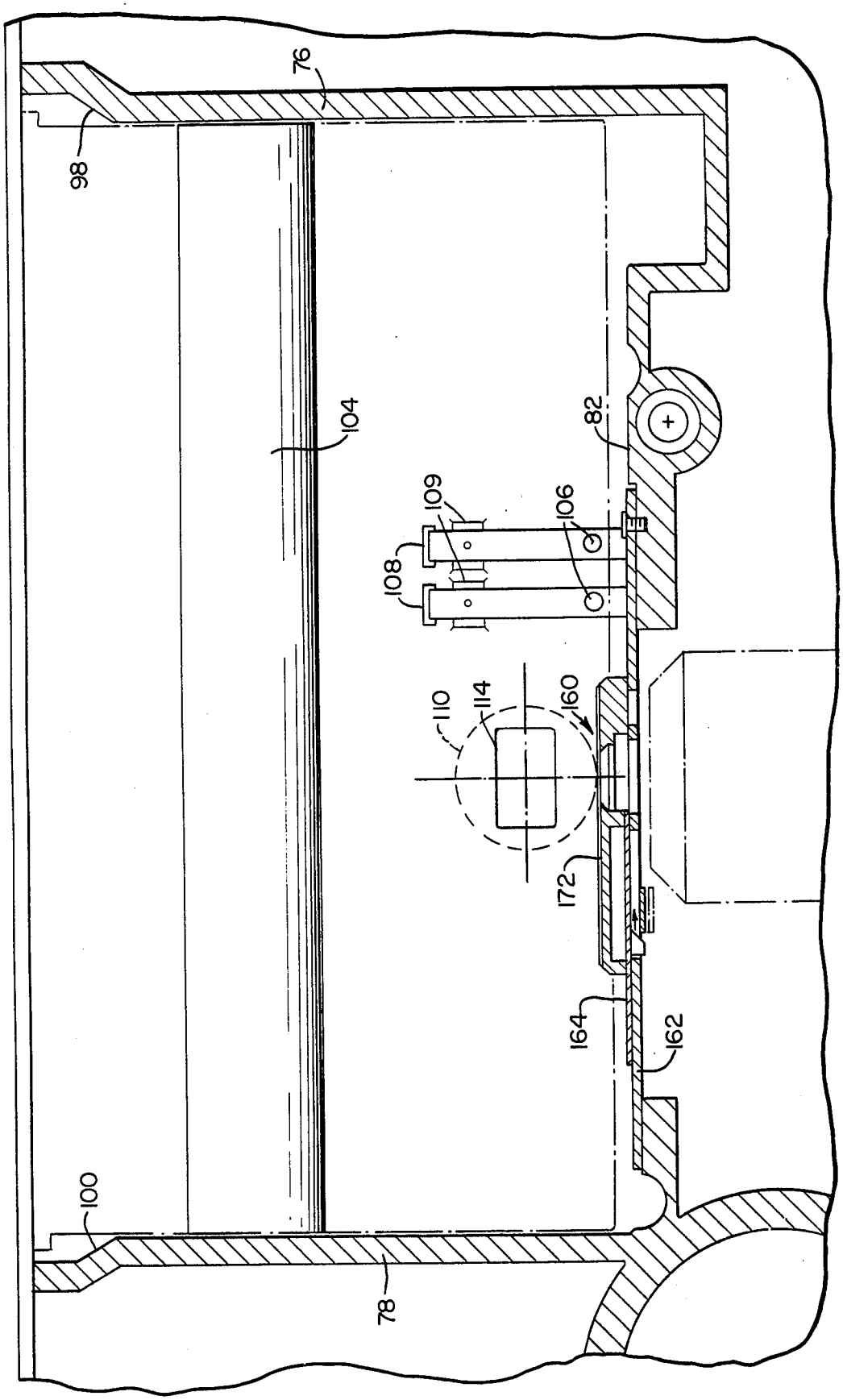
FIG. 8 is a fragmentary cross-section on line 8—8 of FIG. 6.

An air conduit coupling 110 extends outwardly of the wall 90 to facilitate the connection of an air hose 112 from the blower housing 70. As shown in FIG. 8, the coupling 110 opens to the cassette interior through a generally rectangular opening 114 centered on the optical axis O to be aligned with the air vent holes 38 in the cassette 12. As above mentioned, the air vent holes 38 are disposed directly behind the reflecting prism 30.

Cassette well components presented from the vertical wall surface 80 are illustrated most clearly in FIGS. 6, 7, 8 and 10 of the drawings. As shown in FIG. 7, a circular projection light aperture 119 is provided in the wall 80 of the casting 66 to be concentric with the optical axis O and thus aligned with the projection lamp 58 as well as with the reflecting prism 30 presented on the side wall 14 of the cassette 12 when the latter is positioned in the well 56. It will be noted that the circular aperture 119 opens to the cassette interior in the bottom of a generally triangular recess 120 machined in the wall surface 80. The recess 120 accommodates a blade-like blinder 121 pivoted on an axis 122 for movement from the open position depicted in FIG. 7 to a position overlying the circular aperture 119 in a manner to prevent entrance of light through the aperture to the cassette well interior. Pivotal movement of the blinder 121 in this manner is effected by a pin 123 extending through an arcuate aperture 124 in the wall 80 and into engagement with a shift plate assembly (not shown), movable between two positions corresponding to the respective pivotal positions of the blinder 121. The blockage of light passing through the aperture 119 and the reflecting prism 30 in the cassette is important to prevent exposure of the film strip 34 to unwanted light during processing.

A pair of spool drive heads 125 and 126 are journalled for rotation in the wall 80 on axes to be aligned with the respective take-up and supply spool drive sprockets 26 and 28. The drive heads 125 and 126 are designed for one way engagement with drive sprockets 26 and 28 presented through the wall 14 of the cassette 12 and as shown in FIG. 6, project inwardly of the wall surface 80 so as to extend at least partially through the cassette wall 14. While the projection of the drive heads into the well 56 in this manner is needed to insure driving engagement thereof with the cassette contained film spools, it will be appreciated that because of this inward projection, the drive heads 125 and 126 present an obstruction to vertical sliding movement of the cassette along the wall surface 80.

To facilitate guiding the edge of the bottom wall 24 of the cassette 12 past the drive heads 125 and 126 and also to assist in ejecting the cassette 12 from the well 56, there is provided in accordance with this invention a pair of L-shaped guide members 127 and 128 which are yieldably supported in the wall 80 at locations spaced along the length of the cassette well 56 for movement between a first position depicted by phantom lines in FIG. 6 and in which the cassette well 56 is empty, and a second position depicted by solid lines in FIG. 6 in which the cassette 12 is loaded into the well 56. Each of the L-shaped guide members 127 and 128 is similarly shaped to provide a defined edge portion in the form of a laterally extending cassette bearing foot 130 which depends from a generally vertical elongated leg portion 131 having a bracket formation 132 for engagement by one end of a tension spring 133, the other end of which is engaged with a similar bracket 134 or other means suitably fixed to the casting 66. The leg portion 131 includes another defined edge portion depending therefrom in the form of an upwardly inclined or chamfered end surface 135. Means for connecting each of the guide members 127 and 128 for movement relative to the wall 80 are provided in the form of a respective elongated slot 136 in the wall 80. In particular, it will be noted that the slot 136 is provided with a downwardly inclined guide surface 137 opening through the casting 66 and arranged complementary to still another defined edge portion of each respective guide member 127, 128, in the form of an upwardly inclined or chamfered end surface 137' opposite the inclined surface 135. The edge surface 138 of the elongated leg portion 131 is inclined to approximate parallelism with the inner surface of the cover plate wall 90 in its initial or first position. Thus as is now readily apparent, the guide members 127 and 128 are connected to respective slots 136 for movement between the first position wherein the inclined surface 135 extends laterally outward of the wall 80 beyond the profile of the drive heads 125, 126 to engage an edge of the leading bottom wall 24 of a cassette as it enters the well 56 as shown by phantom lines in FIG. 6 and a second position inward from the first position as shown by solid lines in FIG. 6 wherein the inclined surface 135 no longer extends laterally outward of the wall 80. In addition, when the guide members 127 and 128 assume the aforementioned second position, the linear edge 138 moves to a position essentially flush with the inner wall surface 80 while the foot 130 still extends laterally outward from the wall surface 80 to engage the leading bottom wall 24 of a cassette upon completion of its insertion into the well 56.

In light of the organization of the L-shaped members 127 and 128, together with the location of the spring 104 on the cover plate wall 90, it will be seen that cassette insertion and retention within the well 56 is effected simply by inserting the bottom wall 24 of the cassette into the mouth of the well. Subsequent downward pressure on the top wall of the cassette will cause the edge of the bottom wall 24 to engage the inclined surface 135 of respective guide members 127 and 128. During this movement, the inclined surface 135 operates to guide the edge of the bottom wall 24 of the cassette past the drive heads 125, 126. Continued insertion of the cassette into the well operates to cause the bottom wall 24 to thereafter engage the feet 130 and thus move each guide member downward and outward from its first position toward its second position while simultaneously elongating springs 133. In this manner, the edge of the bottom wall 24 is slidably disengaged from the inclined surface 135 after being guided past the drive heads 125 thereby preventing any potential damage to the drive heads which might otherwise occur if the edge of the bottom wall 24 were to strike the drive heads. Spring 104 will operate to urge the upper portion of the cassette 12 toward the wall surface 80 such that the top wall of the cassette underlies the lip 84. The bias of the springs 133 acting on the cassette through engagement by the foot portions 130 of the L-shaped members 127 and 128 together with the bias of the spring 104 will retain the cassette firmly in this loaded position.

Thus in the aforementioned manner, the cooperative arrangement between the slot guide surface 137 and the inclined surface 137' of each respective guide member 127, 128 operates to accommodate generally linear translation of each guide member along the wall surface 80 while at the same time accommodating limited lateral translation of each guide member into the wall surface 80 as the guide members are moved from their first position toward their second position.

Ejection of the cassette 12 from the well 56 in accordance with the present invention, is effected by a cassette eject bar 139. Although the complete structure and operation of the eject bar 139 will become apparent from the description to follow, the interaction of the cassette 12 and the eject bar 139 may be understood by reference to FIGS. 6 and 9 of the drawings. As shown in these figures, the wall 80 is provided with an aperture window 140 near the upper portion thereof under the lip 84. A push rod or leg 141 formed integrally on a resilient plastic leaf 142 extends through the window 140 to engage the side of the cassette 12. A power switch S-2 is positioned between the plastic leaf 142 and a flange or tab 143 at the end of the eject bar 139. A switch button 144 is positioned such that movement of the flange tab 143 on the eject bar toward the cassette 12 will advance the leg 141 into the cassette to move it out from under the lip 84. Similarly, insertion of the cassette will engage the leg 141 to close the switch S-2 against the tab 143 on the eject bar 139. In light of this organization, it will be appreciated that movement of the tab 143 to advance the cassette laterally out from under the lip 84 will cause the L-shaped guide members 127 and 128 to move upwardly and eject the cassette 12 from the well. Also, it will be apparent that the switch S-2 will be either opened or closed depending on the absence or presence of the cassette 12 in the well 56.

The following discussion although not essential to an understanding of the above described invention, nevertheless provides a clearer understanding of the operating components of the viewer 10 and cassette 12.

As mentioned above, a snubbing roller in the cassette 12 is intended to operate either as a freely rotatable guide roller during film processing or rewind, or as a fixed snubbing post to facilitate passage of the film strip to the take-up spool during incremental advance of a run in the film strip past the opening 36 in the bottom wall 24 of the cassette. Also, the slotted hub 32 of the snubbing roller is presented through the cassette wall 14 so that it will be placed against the wall surface 80 upon cassette insertion into the well 56. Control over snubbing roll rotation is effected by a snubber pawl 146 as shown in FIGS. 6, 7 and 10 of the drawings. The pawl 146 is disposed in an opening 147 near the bottom of the wall 80 and pivotally supported on a pintle 148. A snubbing roller hub engagement tang 149 projects inwardly through the aperture 147 whereas an actuating rod 150 projects from the lower end of the pawl 146 outwardly past the cassette well 56 to a roller 151 at its outer end. The roller 151 is positioned to overlie a ramp 152 formed as a part of a horizontally movable link 153, part of which is shown by phantom lines in FIG. 7. Although the complete link is not shown in the drawings, it will suffice to note that movement thereof in the direction of the arrow 154 will cause raising and lowering of the roller 151. Also, the link supports a clip 156 to be described below. Also it will be understood from this limited description that the movement of the link 153 will pivot the snubbing pawl in the manner to either prevent rotation of the cassette contained snubbing roller or retain it against rotation.

Figure 13:
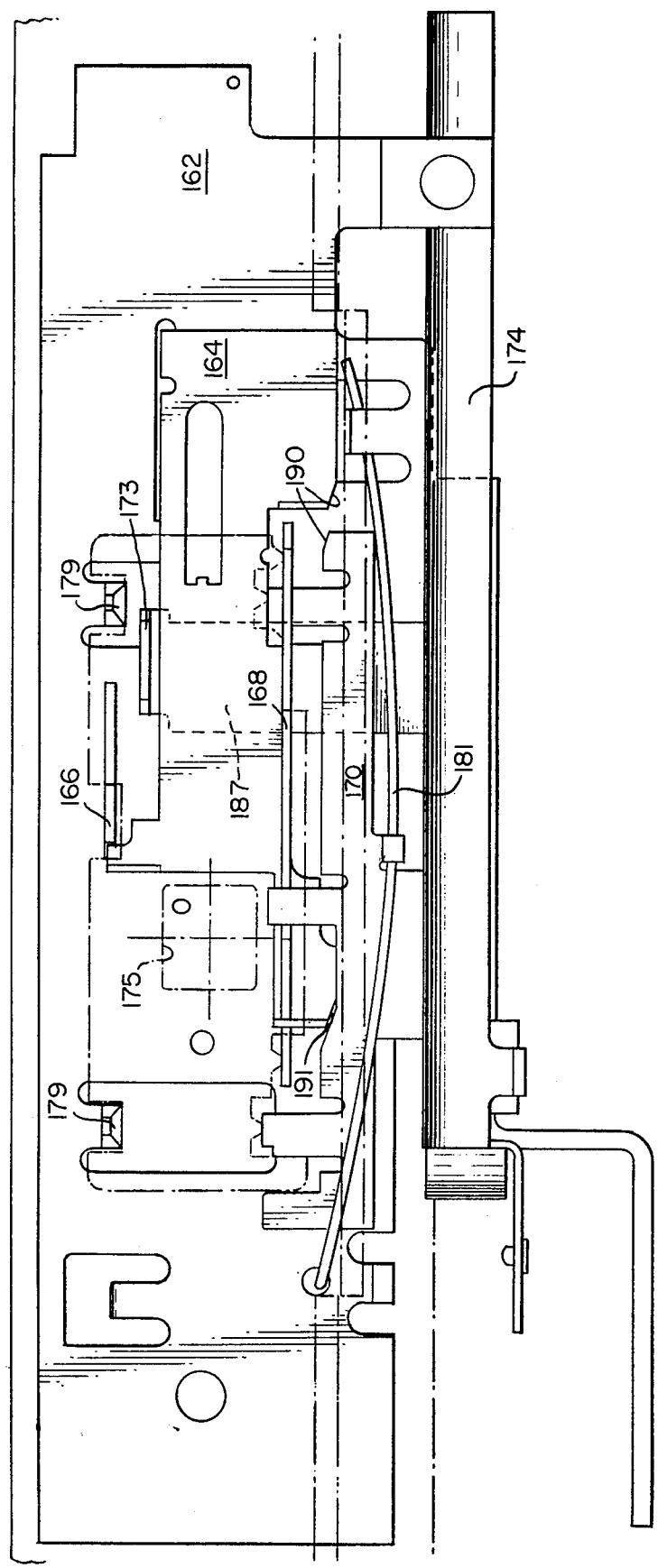
FIG. 13 is an enlarged plan view illustrating a portion of the cassette well floor of the invention as seen on line 13—13 of FIG. 7.

As shown in FIGS. 5, 7, 8, 13 and 14 of the drawings, and fully explained in a copending application for U.S. Pat. Ser. No. 712,381 entitled "Photographic Apparatus Including Improved Aperture Plate" by P. Scibilia, filed Aug. 6, 1976 in common assignment herewith, an aperture block assembly, generally designated by the reference numeral 160, is positioned on the floor 82 of the cassette well 56. Individual components of this assembly are shown most clearly in FIG. 14 to include a foundation plate 162, a blinder plate 164, left and right pressure plate lifters 166 and 168, respectively, a movable side guide 170 and an aperture block 172. These components, in conjunction with a feed claw 173 integral with a feed shuttle 174 (FIGS. 13 and 15) to be described, are oriented in the well 56 to extend through and operate within the opening 36 in the bottom wall of the cassette 12. Thus, the aperture block defines a framing window 175 located in a longitudinal groove 176 to delineate elevated film strip tracks 177 and is peripherally dimensioned under chamfered edges 178 to fit closely within the cassette opening 36 and thus locate the cassette well 56 precisely with respect to the optical center O, particularly in a longitudinal frame of reference. Also, the tracks 177 cooperate with the pressure plate 44 in the cassette 12 to retain the film strip 34 in a vertically fixed planar orientation as it passes the window 175. Lateral positioning of the film strip as it passes the window 175 is effected by fixed guide pins 179 struck out of the foundation plate 162 and extending upwardly beyond the level of the tracks 177 to guidingly engage one edge of the film strip 34. The opposite edge of the film strip is engaged by a pair of similarly shaped guide pins 180 upstanding from the side guide 170. The side guide is slidably mounted on the foundation plate 162 and biased toward the fixed guide pins 179 by a wireform spring 181 as shown in FIG. 13.

While the retention of the film strip against the tracks 177 on the aperture block by the pressure plate 44 in the cassette is desirable during the projection for viewing of successive frame images carried on the film strip, the drag forces exerted on the film strip during film processing and/or rewind are objectionable and moreover, the retention of the film strip precisely in a fixed orientation with respect to the framing window 175 is not necessary during these operational modes. To this end, the left and right plate lifters 166 and 168 are positioned for vertical movement within the aperture block 172 and are movable from a depressed or retracted position upwardly into engagement with the cassette contained, downwardly biased pressure plate 44 to space the pressure plate from the film and the tracks 177. Upward movement of the lifters 166 and 168 is effected by camming surfaces 182 provided on the blinder plate 164 which is shiftable longitudinally with respect to the foundation plate 162 and aperture block 172, the latter being fixed to each other and to the cassette well floor 82. Such longitudinal shifting of the blinder plate is accomplished by the clip 156 carried by the link 153 described above (see FIG. 7) with a depending bifurcated lug 183 on the blinder plate 164 and which extends through an elongated slot aperture 184 to be presented under the well 56 as may be seen in FIG. 7, for example.

The blinder plate 164 also carries a depending cam tab 185 which extends through an opening 186 in the foundation plate 162 to engage an arm 187 extending between film feeding claw 173 and the shuttle 174. Thus, it will be appreciated that simultaneously with elevation of the pressure plate lifters 166 and 168, the claw 173 will be depressed by the camming tab 185 (FIG. 15) on the blinder plate 164 to a position out of engagement with the film strip 34, such as during rewind and/or processing operations. The blinder plate is further formed with an opaque plate or body portion (not shown) positioned adjacent a cut-out (not shown) and normally positioned forwardly and clear of the framing window 175 in the position illustrated in FIG. 13 of the drawings. Rearward movement of the blinder plate by the link 153, however, moves the plate portion under the window 175 to prevent upward passage of light to the film strip 34, again principally during processing thereof.

Figure 14:
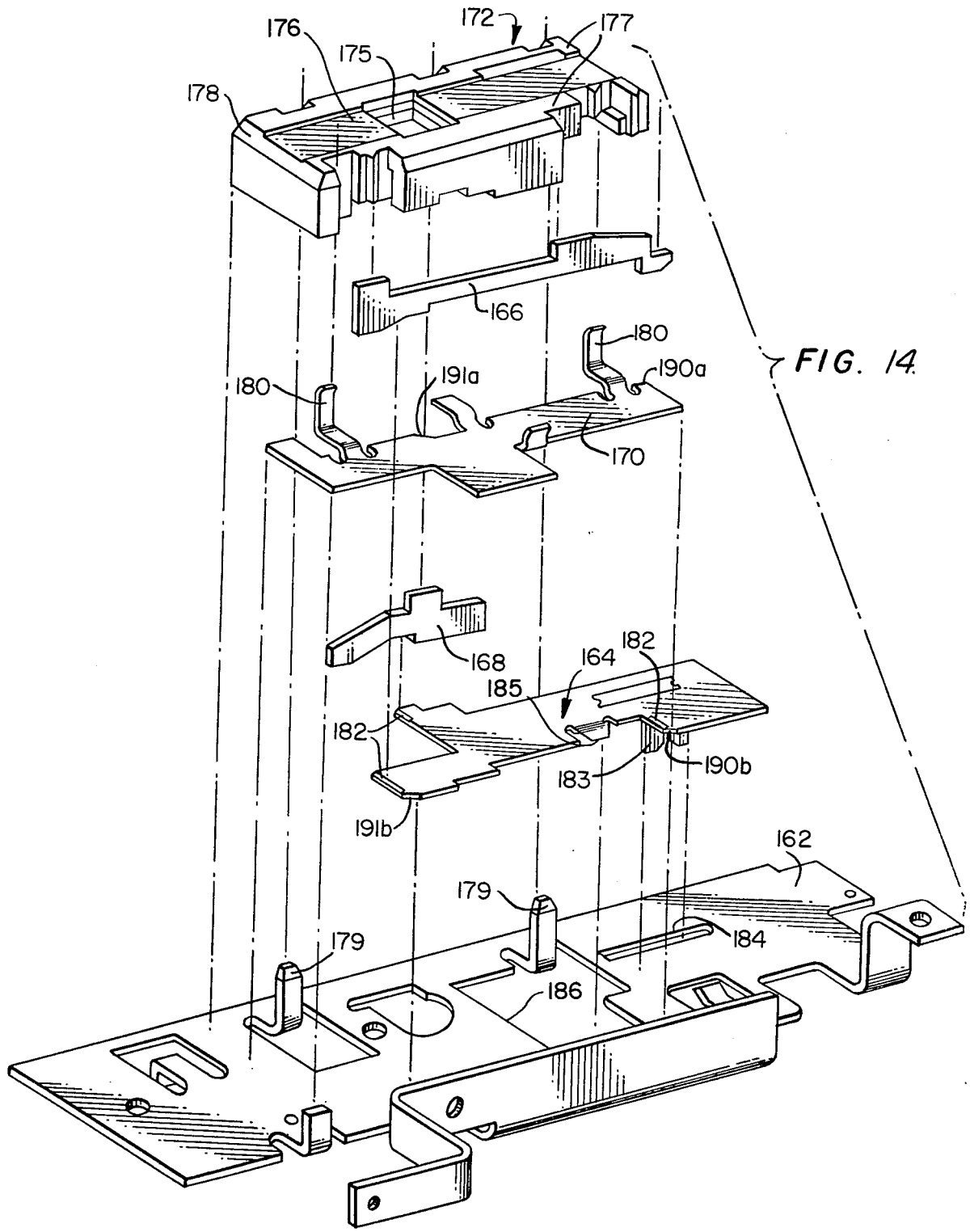
FIG. 14 is an exploded perspective view of components shown in FIG. 13.

As shown most clearly in FIGS. 13 and 14, the movable side guide 170 and the blinder plate 164 are provided with cooperating front and rear camming ramp pairs 190 and 191. These camming ramps are vertically oriented so that rearward movement of the blinder plate 164 in the manner described will additionally move the side guide 170 outwardly against the bias of the wireform spring 181.

The film feeding shuttle 174 is an integral stamping with the claw 173 and arm 187. The shuttle is an elongated member of arcuate transverse section and adapted to be driven by a rotatable cam 192 in a manner such that the claw 173 undergoes reciprocable back and forth motion simultaneously with rotatable up and down motion to engage and disengage the feed apertures 42 and the film strip 34. Although a detailed description of the film feed shuttle 174 is not necessary for a complete understanding of the present invention, it will be noted by reference to FIGS. 13 and 15 that the shuttle 174 is supported along the exterior of the cover plate wall 90. Support for the feed shuttle 174 is provided by inner and outer bearing blocks 193 and 194 mounted on a vertical flange 195 and a bracket formation 196 formed respectively on the foundation plate 162. The shuttle body 174 is retained against the bearing blocks by front and rear springs 197 and 198 in a manner to achieve the appropriate movement of the claw 173 and also in a manner to permit the depression of the claw 173 and arm 187 by the depending cam tab 185 on the blinder plate 164 in the manner above described.

Figure 12:
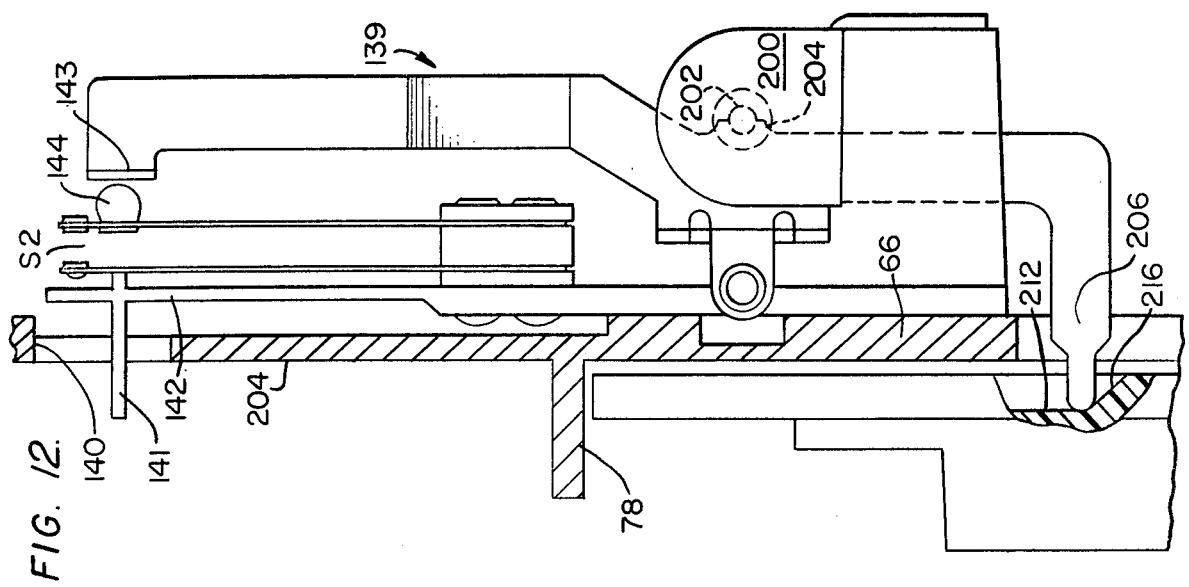
FIG. 12 is a cross-section taken on line 12—12 of FIG. 11.
Figure 11:
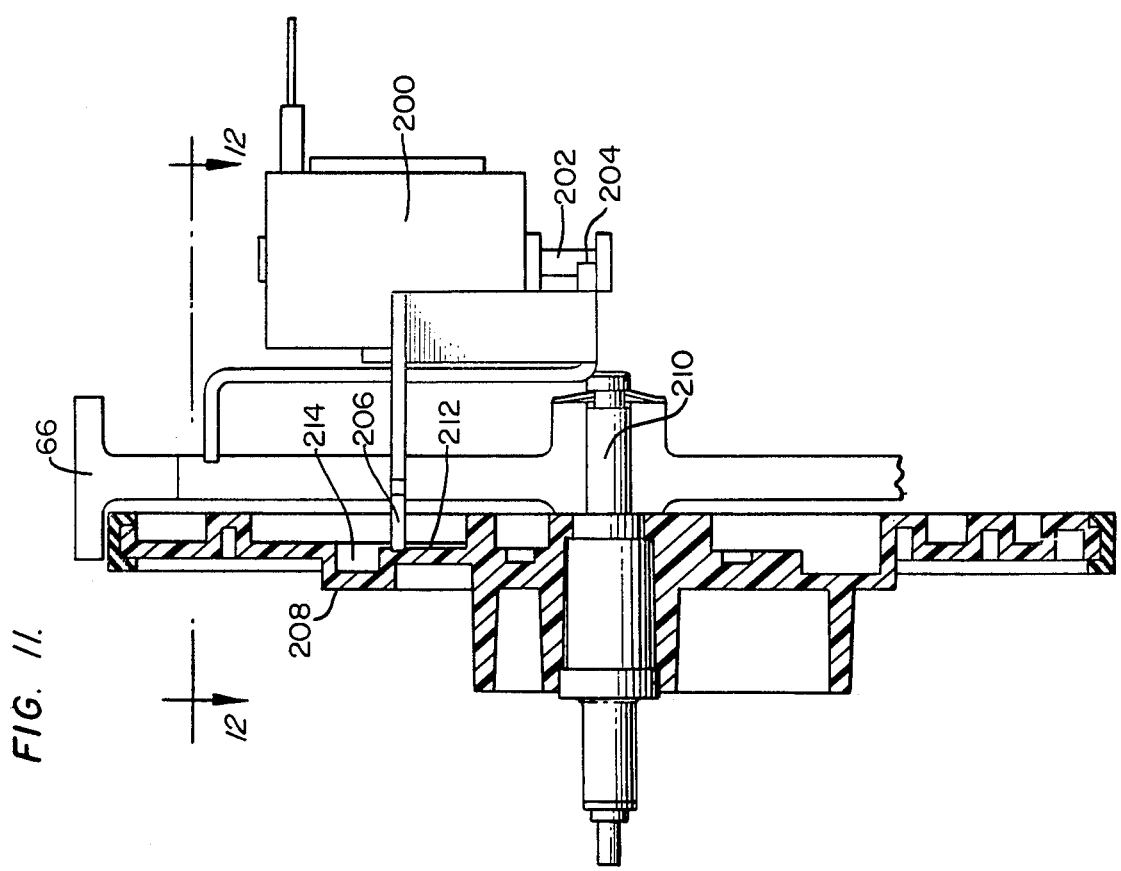
FIG. 11 is an end view in partial cross-section illustrating a cassette ejecting organization associated with the cassette well of the invention.

As described above, the eject bar 139 operates through the power switch S-2 and the leaf spring supported push rod 141 to advance the upper portion of the cassette 12 outwardly from under the transverse lip 84 so that the cassette will be ejected from the well 56. A more complete understanding of the construction of the eject bar 139 may be had by reference to FIGS. 11 and 12 of the drawings. As shown, the eject bar 139 extends rearwardly from the end on which the tab 143 is mounted under a lifting solenoid 200 having a plunger 202 to pivotally engage the bar at a fulcrum point 204. The bar then extends upwardly and rearwardly to an inturned cam follower lug 206 in engagement with a programming cam disc 208. The programming cam disc is supported for rotary movement on the axle 210 carried by the casting 66 forwardly in the viewer of the cassette well 56. The programming cam 208 is adapted to be indexed by means (not shown) to control the operation of the viewer 10 in an "off" "process/-rewind" and "project" modes of operation. Although the programming disc 208 carries a plurality of individual cam tracks, it will be noted in FIG. 11 that the follower lug 206 on the eject bar engages a cam track 212 radially adjacent to and inwardly of an annular recess 214, the track 212 having a ramp 216 operable to pivot the eject bar 139 about the plunger 202 of the solenoid 200 in a direction to cause the cassette ejection movement described above. In addition, energization of the solenoid 200 such that the lug 206 is lifted to ride in the track 214 will prevent cassette ejection by the ramp 216. Because of this organization, operation of the eject bar, being the combined function of the solenoid 200 and the logic disc 208 will enable indexing rotation of the cam disc independently of a cassette eject operation.

In light of the construction of the cassette well 56 and organization of components therein adapted to cooperate with the cassette 12 it will be seen that while the well facilitates cassette insertion, it also positions and orients the cassette precisely with respect to operating components supported by the casting 66. The precise registration of the cassette with viewer mounted components is provided in substantial measure by the formation of the wall 90 and the lip 84 against which the cassette is biased by a combination of the springs 133 through the L-shaped members 127 and 128 and the cassette loading spring 104. The latter spring additionally functions to prevent light leakage through the space between the vertical wall 90 of the cover plate and the lower portion of the cassette wall 16 in which the air vent openings 38 are located. The additional light seals provided by the blinder 121 and the blinder plate 164 prevent leakage of light through the prism 30 and the framing window 175, a feature important to processing of the film strip 34.

It will be appreciated therefore, that the present invention provides an improved cassette well construction for motion picture viewing apparatus of the type described and by which the above-mentioned objectives are completely fulfilled. It will be apparent to those skilled in the art from the preceding description that various changes in/or modifications may be made in the illustrated embodiment without departure from the inventive concepts manifested by the disclosed embodiment only, not limiting, and that the true spirit and scope of the present invention be determined by reference to the appended claims.

What is claimed is:

1. In an apparatus for viewing by projection a photographic film strip contained within a substantially thin film cassette which has a pair of opposed major wall surfaces connected and spaced apart by a peripheral wall substantially defining the thickness of the cassette and having an opening therein for projection of transparent image forms contained on the film strip together with drive coupling means recessed in one major wall surface, wherein the viewing apparatus is of the type having means for receiving the cassette and operatively positioning the cassette therewithin including: an elongated opening slightly wider than the thickness of the cassette through which the cassette can be slidably inserted into the apparatus; a wall surface extending inwardly of the apparatus from the opening in a plane substantially perpendicular to the plane of the opening; at least one spool drive head journalled for rotation with respect to the wall surface and extending outward therefrom for complementary engagement with the cassette drive coupling means upon complete insertion of the cassette within the apparatus receiving means; means for engaging the other major surface of the cassette opposite from the drive coupling means as the cassette enters said apparatus and for resiliently urging the cassette towards the wall surface so that the major surface associated with the drive coupling means will ultimately nest against the wall surface with the spool drive head in driving engagement to the cassette drive coupling means; and means for restraining withdrawal of the cassette from the apparatus without first forcibly displacing the cassette laterally away from its nesting position adjacent the wall surface, the improvement comprising:

at least one guide member having a first defined edge portion spaced apart from a second defined edge portion;

means associated with the wall surface and complementary to said guide member for connecting said guide member for movement relative to the wall surface between a first position wherein said first edge portion extends laterally outward of the wall surface beyond the profile of the drive head to engage an edge of the leading peripheral wall of a cassette as it enters the apparatus and said second edge portion is spaced inward of said first edge portion with respect to the opening and also extends laterally outward of the wall surface and a second position inward from said first position with respect to the opening; wherein said first edge portion of said guide member no longer extends laterally outward of the wall surface while said second edge portion of said guide member still extends laterally outward of the wall surface so as to engage the leading peripheral wall of the cassette upon complete insertion of the cassette within the apparatus receiving means, said first edge portion when in said first position operating to engage the edge of the leading peripheral wall of the cassette as it enters the apparatus in a manner such that upon continued insertion of the cassette into the apparatus, said guide member operates to guide the edge of the leading peripheral wall of the cassette past the drive head whereupon, said first edge portion is disengaged from the edge of the leading peripheral wall of the cassette which thereafter engages said second edge portion of said guide member to move said guide member from its said first position toward its said second position, and resilient means for yieldably urging said guide member to move from its said second position toward its said first position thereby resiliently urging the cassette when engaged by said second edge portion to move in a direction outwardly of said apparatus.

2. The apparatus of claim 1 wherein said guide member includes an elongated leg portion from which said first and second edge portions depend and which further includes a third edge portion also depending therefrom in a direction generally opposite from said first edge portion and said connecting means includes an elongated slot having at least one guide surface complementary to said third edge portion of said guide member so as to accommodate generally linear translation of said guide member along the wall surface while at the same time accommodating limited lateral translation of the guide member into the wall surface as said guide member is moved from said first position toward said second position.

3. The apparatus of claim 2 wherein said first edge portion is defined by an inclined end surface of said leg portion which surface extends downwardly and outwardly from the wall surface to present a surface upon which the edge of the leading peripheral wall of the cassette can slidingly engage as it moves past the drive head, slidingly disengaging from the end of said inclined end surface after clearing the drive head.

4. The apparatus of claim 2 wherein said second edge portion is defined by a cassette bearing foot extending laterally outward from said elongated leg portion.

5. The apparatus of claim 2 wherein said third edge portion is defined by an inclined end surface opposite said first edge portion and said guide surface of said slot is defined by another inclined surface slidably engaged to said guide member inclined surface during at least a portion of the movement of said guide member from said first position to said second position, said engaged inclined surfaces serving to facilitate said generally linear translation of said guide member along the wall surface in concert with said limited lateral translation of said guide member into the wall surface.

6. The apparatus of claim 2 wherein said resilient means includes a spring fixedly connected at one end to a location behind the wall surface with the other end thereof connecting to said guide member, said spring being angled with respect to said slot and guide member so as to simultaneously urge said guide member in directions toward said first position and into said wall surface.

7. In an apparatus for transforming the informational content of an information retainable strip contained within a substantially thin cassette which has a pair of opposed major wall surfaces connected and spaced apart by a peripheral wall substantially defining the thickness of the cassette and having an opening therein for providing direct access to the strip together with drive coupling means recessed in one major wall surface, wherein the apparatus is of the type having means for receiving the cassette and operatively positioning the cassette therewithin including: an elongated opening slightly wider than the thickness of the cassette through which the cassette can be slidably inserted into the apparatus; a wall surface extending inwardly of the apparatus from the opening in a plane substantially perpendicular to the plane of the opening; at least one spool drive head journalled for rotation with respect to the wall surface and extending outward therefrom for complementary engagement with the cassette drive coupling means upon complete insertion of the cassette within the apparatus receiving means; means for engaging the other major surface of the cassette opposite from the drive coupling means as the cassette enters said apparatus and for resiliently urging the cassette towards the wall surface so that the major surface associated with the drive coupling means will ultimately nest against the wall surface with the spool drive head in driving engagement to the cassette drive coupling means; and means for restraining withdrawal of the cassette from the apparatus without first forcibly displacing the cassette laterally away from its nesting position adjacent the wall surface, the improvement comprising:

at least one guide member having an elongated leg portion from which depend a first defined edge portion, a second defined edge portion spaced apart from said first defined edge portion and a third defined edge portion opposite from said first edge portion;

means associated with the wall surface and complementary to said guide member for connecting said guide member for movement relative to the wall surface between a first position wherein said first edge portion extends laterally outward of the wall surface beyond the profile of the drive head to engage an edge of the leading peripheral wall of a cassette as it enters the apparatus and said second edge portion is spaced inward of said first edge portion with respect to the opening and also extends laterally outward of the wall surface and a second position inward from said first position with respect to the opening wherein said first edge portion of said guide member no longer extends laterally outward of the wall surface while said second edge portion of said guide member still extends laterally outward of the wall surface so as to engage the leading peripheral wall of the cassette upon complete insertion of the cassette within the apparatus receiving means, said first edge portion when in said first position operating to engage the edge of the leading peripheral wall of the cassette as it enters the apparatus in a manner such that, upon continued insertion of the cassette into the apparatus, said guide member operates to guide the edge of the leading peripheral wall of the cassette past the drive head whereupon said first edge portion is disengaged from the edge of the leading peripheral wall of the cassette which thereafter engages said second edge portion of said guide member, to move said guide member from its said first position toward its second position, said connecting means including an elongated slot having at least one guide surface complementary to said third edge portion of said guide member so as to accommodate generally linear translation of said guide member along the wall surface while at the same time accommodating limited lateral translation of the guide member into the wall surface as said guide member is moved from said first position toward said second position; and resilient means for yieldably urging said guide member to move from its said second position toward its said first position thereby resiliently urging the cassette when engaged by said second edge portion to move in a direction outwardly of said apparatus.

* * * * *